UNITED STATES PATENT OFFICE.

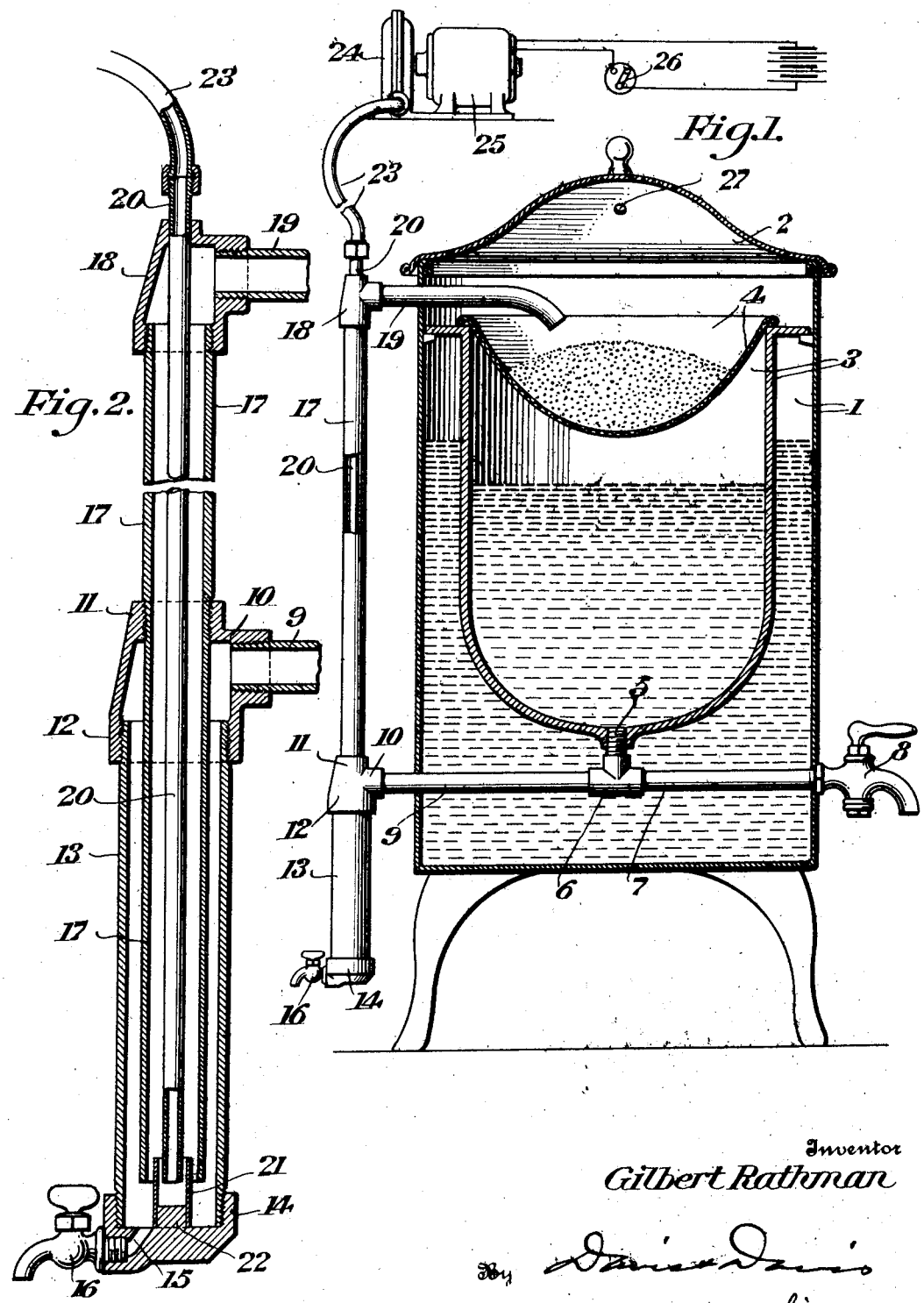

GILBERT RATHMAN, OF NEW YORK, N. Y., ASSIGNOR OF TWO-FIFTHS TO JAMES A. BROWN AND ONE-FIFTH TO WILLIAM HODGKINSON, BOTH OF NEW YORK, N. Y.

COFFEE PERCOLATOR.

1,405,939.   Specification of Letters Patent.   Patented Feb. 7, 1922.

Application filed July 12, 1921. Serial No. 484,021.

*To all whom it may concern:*

Be it known that I, GILBERT RATHMAN, a citizen of the United States, and resident of the borough of Manhattan, city, county, and State of New York, have invented certain new and useful Improvements in Coffee Percolators, of which the following is a specification.

This invention relates to improvements in coffee percolators, and more particularly to percolators designed for use in lunch rooms and restaurants for making coffee in large quantities.

The main objects of the invention are to provide simple and efficient means for rapidly circulating the liquid in the coffee receptacle through the ground coffee in the usual bag at the top of the receptacle for the purpose of obtaining an extract or infusion of the desired strength; to provide a circulating means so constructed that the presence of valves and other working parts in the path of the liquid is avoided; and to provide a circulating means which may be readily cleaned. To these ends the invention consists in the various features of construction and combinations of elements hereinafter more fully described, and particularly pointed out in the appended claims.

In the drawing:

Fig. 1 is a vertical sectional view of the percolator; and

Fig. 2 a detail vertical sectional view of a part of the coffee extract circulating means on an enlarged scale.

Referring to the various parts by numerals, 1 designates the outer casing or hot water tank of the percolator which is provided with the usual removable cover or top 2, and the inner coffee extract receptacle 3, having the bag 4 for ground coffee supported at the open upper end thereof.

At the bottom of the extract receptacle 3 is an outlet 5 leading to a T-fitting 6 to one branch of which the inner end of a horizontal discharge pipe 7 is connected. Pipe 7 extends outwardly through the casing 1 and the usual faucet 8 is attached to the outer end of said pipe. The inner end of a horizontal pipe 9 is connected to the other branch of the fitting 6, said pipe extending outwardly through casing 1 and having its outer end screwed in one branch of a T-fitting 10. Fitting 10 has two aligned vertical branches 11 and 12, the lower branch 12 being of greater diameter than branch 11 and having the upper end of well or cylinder 13 screwed therein. The lower end of cylinder 13 is closed by a detachable cap 14 which is threaded on said cylinder and is provided with a drain port 15 leading to a faucet or drain cock 16.

A cylinder or pipe 17 of smaller diameter than cylinder 13 extends from a point opposite the upper end of tank 1 down through fitting 10 and cylinder 13 to point a short distance above the lower end of the cylinder 13, said cylinder 17 having a threaded connection with the branch 11 of fitting 10. The upper end of pipe 17 is threaded into one branch of an elbow fitting 18 in the other branch of which is screwed the outer end of a horizontal discharge pipe 19 which extends inwardly through casing 1 to a point over the coffee bag 4 and is provided with a downwardly turned discharge end.

An air supply pipe 20 extends downwardly through the upper end of fitting 18 and through pipe 17 to the lower end of said pipe 17. A short deflector tube 21 is secured to a plug 22 formed on cap 14 and extends upwardly within pipe 17 about the air pipe 20 to a point above the lower ends of said pipes 17 and 20. Any suitable means may be provided for supplying air under pressure at will to pipe 20. For this purpose I have shown an air hose 23 connected with the upper end of pipe 20 and leading from the outlet of a fan blower 24 driven by an electric motor 25 which may be started and stopped at will through the medium of a switch 26.

It will be obvious that water poured into the inner receptacle 3 may be withdrawn from the lower end of said receptacle and discharged into the upper end thereof through the ground coffee in bag 4 by starting the motor 25 and blower 24 and supplying a blast of air downward through pipe 20. Normally, liquid in receptacle 3 flows through pipe 9 into cylinder 13, filling said cylinder and rising in pipe 17 as high as the liquid level in receptacle 3, as shown in Fig. 1. When air under pressure is supplied to pipe 20 it is discharged into the tubular deflector 21 which diverts the blast upwardly within pipe 17. The air blast causes the column of liquid in pipe 17 to rise and discharge through pipe 19 into bag 4 where it passes through the ground coffee back into receptacle 3. A very small motor and blower will supply sufficient air pressure as a blast of air at relatively low pressure will be sufficient to cause the circulation of the liquid since the height of lift is small. Moreover, the column of liquid in pipe 17 will become aerated or filled with bubbles and, being thus rendered lighter than the liquid column in cylinder 13, pipe 9 and receptacle 3, the pressure of the latter liquid column will assist the force of the air blast in elevating the column of aerated liquid in pipe 17.

The cover 2 is supplied with one or more apertures 27 for the escape of air. The circulating system may be drained of liquid and sediment through the drain cock 16. It will be observed that the circulating system consists of lengths of straight piping which may be readily disconnected and may be easily cleaned.

Pipe 20 is soldered to elbow 18 at the point where said pipe passes through the top wall of the elbow.

What I claim is:

1. The combination with a coffee percolator of repouring means comprising a closed well connected with the extract receptacle of the percolator and located below the level of the lower end of said receptacle, a vertical pipe depending into said well, an air supply pipe extending downward through said vertical pipe, a branch pipe leading from said vertical pipe at a point above the well to a point over the extract receptacle of the percolator, and means for supplying air under pressure to the upper end of the air supply pipe at will.

2. Coffee percolating apparatus comprising an urn having an extract receptacle therein open at its upper end, a coffee bag supported across the open end of the receptacle, a vertical cylinder having a closed lower end, a conduit connecting the lower end of the receptacle with said cylinder, a vertical pipe depending into said cylinder to a point adjacent the lower end of the cylinder, a branch pipe leading from the upper end of said vertical pipe to a point over the coffee bag, and means for discharging air under pressure into said vertical pipe adjacent the lower end thereof.

3. Coffee percolating apparatus comprising an urn having an extract receptacle therein open at its upper end, a coffee bag supported across the open end of the receptacle, a vertical cylinder having a closed lower end, a conduit connecting the lower end of the receptacle with said cylinder, a vertical pipe depending into said cylinder to a point adjacent the lower end of the cylinder, a branch pipe leading from the upper end of said vertical pipe to a point over the coffee bag, and means for discharging air under pressure at will upwardly within said vertical pipe at a point above the lower end of said pipe.

4. The combination with a coffee percolator of repouring means comprising a closed well connected with the extract receptacle of the percolator and located below the level of the lower end of said receptacle, a vertical pipe depending into said well, an air supply pipe extending downward through said vertical pipe, a branch pipe leading from said vertical pipe at a point above the well to a point over the extract receptacle of the percolator, and a drain cock connected with the lower end of said well.

5. The combination with a coffee urn having an extract receptacle therein open at its upper end, of repouring means comprising a closed well in communication with the lower end of said receptacle, a conduit extending from a point adjacent the lower end of said well to a point over the open end of said receptacle, and means for discharging air under pressure into said conduit at a point adjacent the lower end thereof.

In testimony whereof I hereunto affix my signature.

GILBERT RATHMAN.